US009035925B2

(12) United States Patent
Kim et al.

(10) Patent No.: US 9,035,925 B2
(45) Date of Patent: May 19, 2015

(54) CIRCUIT FOR CONTROLLING NON-SIGNAL OF FLAT PANEL DISPLAY DEVICE

(75) Inventors: Byung-Min Kim, Cheong-si (KR); Young-Gi Kim, Daejeon-si (KR); Dong-Yun Jeong, Cheong-si (KR); Joon-Ho Na, Daejeon-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 624 days.

(21) Appl. No.: 13/298,952

(22) Filed: Nov. 17, 2011

(65) Prior Publication Data

US 2012/0127137 A1 May 24, 2012

(30) Foreign Application Priority Data

Nov. 19, 2010 (KR) ........................ 10-2010-0115641

(51) Int. Cl.

*G06F 3/038* (2013.01)
*G09G 5/00* (2006.01)
*G09G 3/00* (2006.01)
*G09G 3/32* (2006.01)
*G09G 3/36* (2006.01)

(52) U.S. Cl.

CPC .................. *G09G 5/00* (2013.01); *G09G 3/006* (2013.01); *G09G 3/3241* (2013.01); *G09G 3/325* (2013.01); *G09G 3/3266* (2013.01); *G09G 3/3275* (2013.01); *G09G 3/3283* (2013.01); *G09G 3/3291* (2013.01); *G09G 3/3611* (2013.01); *G09G 3/3655* (2013.01); *G09G 3/3674* (2013.01); *G09G 3/3685* (2013.01); *G09G 3/3696* (2013.01); *G09G 2300/0408* (2013.01); *G09G 2300/043* (2013.01); *G09G 2310/0259* (2013.01); *G09G 2310/0267* (2013.01); *G09G 2310/027* (2013.01); *G09G 2310/0272* (2013.01); *G09G 2310/0275* (2013.01); *G09G 2310/0281* (2013.01); *G09G 2310/0283* (2013.01); *G09G 2310/0294* (2013.01); *G09G 2310/0297* (2013.01); *G09G 2310/067* (2013.01); *G09G 2310/08* (2013.01); *G09G 2330/028* (2013.01); *G09G 2370/08* (2013.01); *G09G 2370/14* (2013.01)

(58) Field of Classification Search

USPC .................................................. 345/204, 213
See application file for complete search history.

(56) References Cited

U.S. PATENT DOCUMENTS

| | | | | |
|---|---|---|---|---|
| 2010/0225637 | A1 * | 9/2010 | Jeon et al. | 345/213 |
| 2011/0157103 | A1 * | 6/2011 | Chen et al. | 345/204 |
| 2011/0234574 | A1 * | 9/2011 | Tanaka et al. | 345/211 |

FOREIGN PATENT DOCUMENTS

| | | |
|---|---|---|
| JP | 2002-41005 | 2/2002 |
| KR | 10-2004-0016184 | 2/2004 |

* cited by examiner

*Primary Examiner* — Robin Mishler
(74) *Attorney, Agent, or Firm* — Kile Park Reed & Houtteman PLLC

(57) ABSTRACT

Disclosed is a technique, in which when driving chips are used in which control units are respectively merged in driving devices, all modes of the other driving chips are simultaneously converted into a fail safe mode when one driving chip detects a non-signal state. A circuit for controlling a non-signal of a flat panel display device includes a plurality of driving chips. When detecting a non-signal state that the normal signal (LVDS) is not inputted from an outside, each of the plurality of driving chips simultaneously changes potentials of non-signal detection pads of its own driving chip and another driving chip so that all the driving chips are operated in the fail safe mode.

5 Claims, 4 Drawing Sheets

CIRCUIT FOR CONTROLLING NON-SIGNAL OF FLAT PANEL DISPLAY DEVICE

BACKGROUND OF THE INVENTION

1. Field of the Invention

The present invention relates to a technique for controlling a non-signal of a flat panel display device, and more particularly, to a circuit for controlling a non-signal of a flat panel display device, in which when driving chips are used in which control units are respectively merged in driving devices, all modes of the other driving chips are simultaneously converted into a fail safe mode when one driving chip detects a non-signal state.

2. Description of the Related Art

Recently, flat panel display devices such as a liquid crystal display (LCD), a plasma display panel (PDP) and an organic light emitting diode (OLED) panel have been widely spread and used. Among these flat panel display devices, the LCD has been more widely spread.

FIG. 1 is a block diagram of a related art LCD.

Referring to FIG. 1, the related art LCD includes a liquid crystal panel 110, a timing controller, a plurality of source driver integrated circuits (ICs) 130A to 130C, and a gate driver IC 140.

The liquid crystal panel 110 has a plurality of pixels arrayed in a matrix form at intersection areas of a plurality of data lines and a plurality of gate lines. A transistor formed in each of the pixels provides a data voltage inputted from the data lines to liquid crystal cells in response to a scan signal supplied from a corresponding gate line. A storage capacitor is formed in each of the liquid crystal cells. The storage capacitor performs a function of constantly maintaining the voltage of the liquid crystal cell. Accordingly, an image is displayed on the liquid crystal panel 110.

The timing controller 120 is mounted on a main board separated from the liquid crystal panel 110 so as to generate a gate control signal for controlling the gate driver IC 140 and a data control signal for controlling the source driver ICs 130A to 130C using vertical/horizontal synchronization signals and a clock signal, which are supplied from a system. The timing controller 120 realigns low-voltage differential signaling (LVDS) that is digital video data (RGB) inputted from the system, and supplies the realigned LVDS to the source driver ICs 130A to 130C.

The source driver ICs 130A to 130C are generally attached to one edge of the liquid crystal panel 110. The source driver ICs 130A to 130C convert the digital video data (RGB) into a data voltage corresponding to the grayscale value of the digital video data (RGB) in response to the data control signal supplied from the timing controller 120, and supply the converted data voltage to the data lines of the liquid crystal panel 110.

The gate driver IC 140 is generally attached to the other edge of the liquid crystal panel 110. The gate driver IC 140 sequentially supplies a scan signal to the gate lines in response to the gate control signal supplied from the timing controller 120, so that horizontal lines of the liquid crystal panel 110, to which data is supplied, are selectively driven.

In a system using a method in which one timing controller 120 receives the LVDS from the outside thereof and provides the received LVDS to a plurality of source driver ICs 130A to 130C, the timing controller 120 checks a non-signal state the LVDS is not inputted thereto and simultaneously inform the source driver ICs 130A to 130C that the timing controller 120 is currently in the non-signal state. Thus, the plurality of source driver ICs 130A to 130C can simultaneously operate in a non-signal mode (fail safe mode).

In order to satisfy requirements of large-size and slimness of the LCD, a semiconductor chip has recently been developed, in which timing controllers are merged in source driver ICs, respectively.

When source driver ICs (hereinafter, referred to as ‘driving chips’) having timing controllers merged therein are used, each of the driving chips generates image data and a gate line control signal using an internal oscillator. However, frequencies of signals generated by the respective driving chips are slightly different from each other.

Therefore, in a case where the driving chips are in a non-signal state at the same time, the difference between times at which the respective driving chips sense the non-signal state is generated by the difference in frequency between the internal oscillators. FIG. 2 is a waveform diagram illustrating its example.

For example, it is assumed that first to third driving chips are used, the frequency of an oscillator used in the first driving chip is fastest, the frequency of an oscillator used in the second driving chip is slower than that in the first driving chip and faster than that in the third driving chip, and the frequency of an oscillator used in the third driving chip is slowest. In this case, as shown in (a) to (c) of FIG. 2, the first driving chip first detects the non-signal state, the second driving chip then detects the non-signal state, and the third driving chip finally detects the non-signal state. (d) of FIG. 2 illustrates a time at which the first to third driving chips are all in the non-signal state.

As described above, in the related art flat panel display device using TMIC driving chips, the difference between times at which the respective driving chips sense the non-signal state is generated by the difference in frequency between internal oscillators of the driving chips. Hence, all the driving chips do not simultaneously operate in a fail safe mode, and therefore, the system is not stabilized at a corresponding time.

SUMMARY OF THE INVENTION

Accordingly, the present invention has been made in an effort to solve the problems occurring in the related art, and an object of the present invention is to provide a circuit for controlling a non-signal of a flat panel display device, in which when driving chips are used in which control units are respectively merged in driving devices, all modes of the other driving chips are simultaneously converted into a fail safe mode when an arbitrary driving chip detects a non-signal state.

In order to achieve the above object, according to one aspect of the present invention, there is provided a circuit for controlling a non-signal of a flat panel display device, the circuit including: a plurality of driving chips each configured to have a timing controller and a source driver and allow its own driving chip and another driving chip to be simultaneously operated in a fail safe mode when detecting a non-signal state that a normal signal is not inputted from an outside; and a display panel configured to display an image by being driven by a data voltage corresponding to the grayscale value of data inputted from the plurality of driving chips.

BRIEF DESCRIPTION OF THE DRAWINGS

The above objects, and other features and advantages of the present invention will become more apparent after a reading of the following detailed description taken in conjunction with the drawings, in which.

Figure 1:
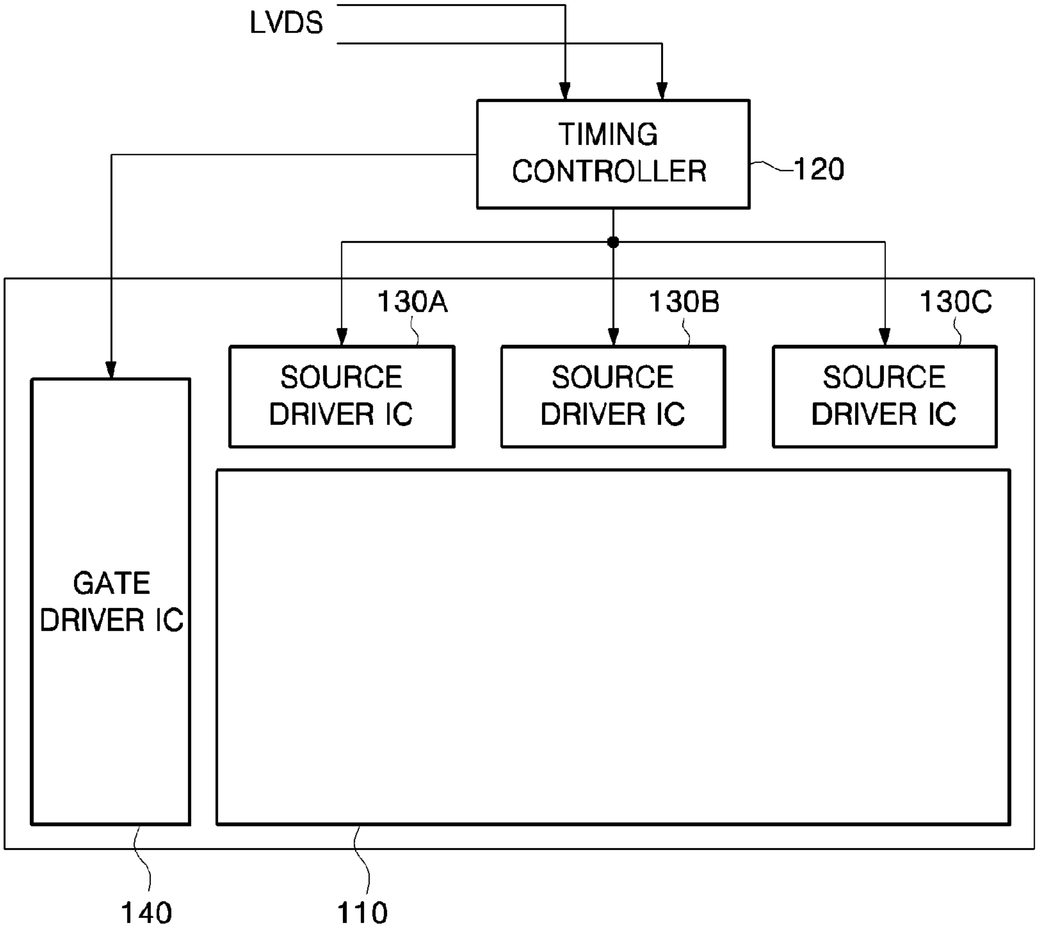
FIG. 1 is a block diagram of a related art LCD.
Figure 2:
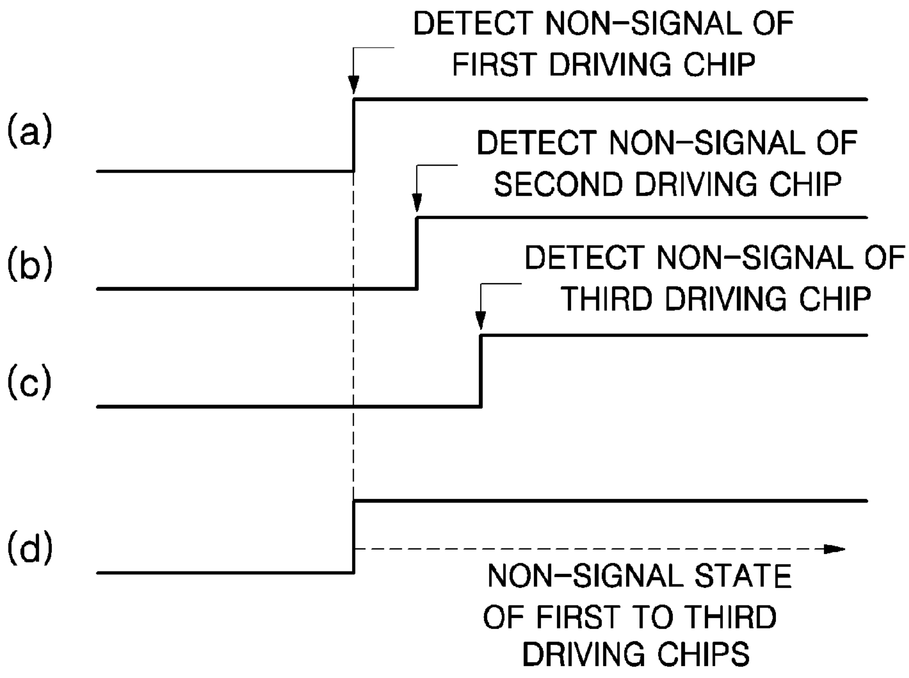
Figure 3:
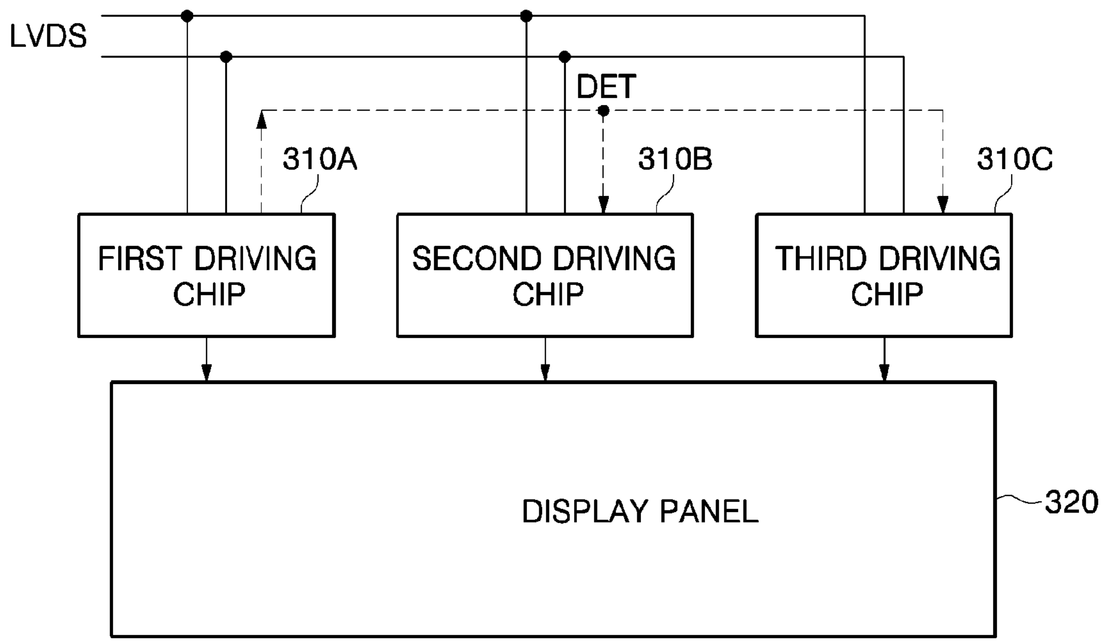
Figure 4:
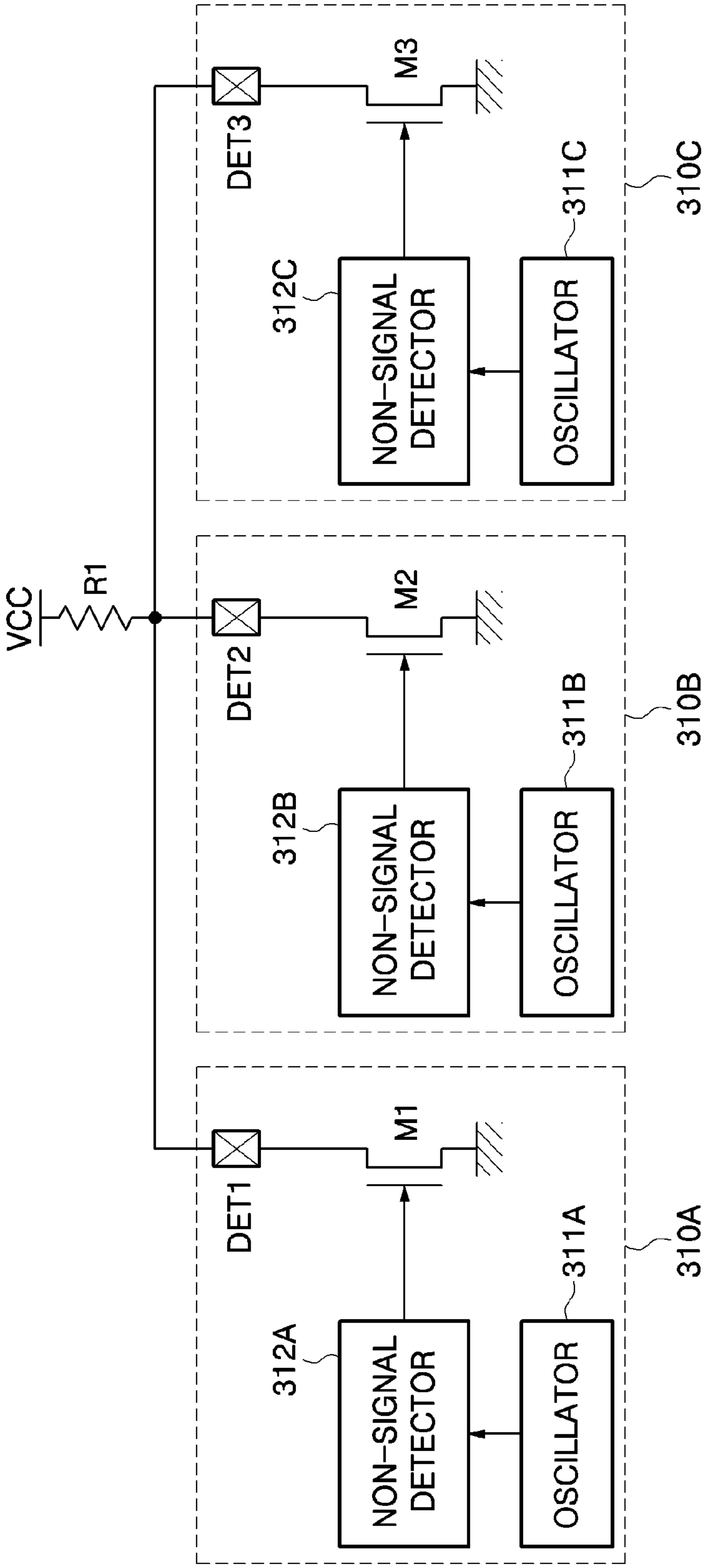

(a) to (d) of FIG. 2 are waveform diagrams illustrating an example of detecting non-signal states in a plurality of driving chips;

FIG. 3 is a block diagram of a circuit for controlling a non-signal of a flat panel display device according to an embodiment of the present invention; and FIG. 4 is a detailed block diagram of driving chips illustrated in FIG. 3.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 3 is a block diagram of a circuit for controlling a non-signal of a flat panel display device according to an embodiment of the present invention.

Referring to FIG. 3, the flat panel display device according to this embodiment includes first to third driving chips 310A to 310C and a display panel 320.

The first to third driving chips 310A to 310C are semiconductor chips (TMIC) in which control units are merged in driving devices, respectively. For example, in a case where the flat panel display panel is an LCD, the control unit corresponds to a timing controller, and the driving device corresponds to a source driver. In this case, the first to third driving chips 310A to 310C align digital video data (RGB) inputted from the outside thereof and convert the aligned digital video data (RGB) into a data voltage corresponding to the grayscale value of the digital video data (RGB). Then, the first to third driving chips 310A to 310C supply the converted data voltage to data lines of the display panel 320. The video data may be transmitted using a low-voltage differential signaling (LVDS) method.

The display panel 320 includes an LCD, a PDP and an OLED panel. For example, in a case where the display panel 320 is a liquid crystal panel, the liquid crystal panel has a plurality of pixels arrayed in a matrix form at intersection areas of a plurality of data lines and a plurality of gate lines. A transistor formed in each of the pixels provides a data voltage inputted from the data lines to liquid crystal cells in response to a scan signal supplied from a corresponding gate line, thereby displaying an image on the liquid crystal panel.

Each of the first to third driving chips 310A to 310C uses a separate internal oscillator. The oscillation frequencies of the oscillators are slightly different from one another depending on conditions in a fabricating process or changes in ambient environment. Therefore, although the first to third driving chips 310A to 310C are simultaneously in a non-signal state that LVDS is not inputted to the control units, the difference between times at which at which the respective driving chips sense the non-signal state is generated by the difference in frequency between the internal oscillators. Here, the non-signal state includes a state that power is applied but a signal (vertical synchronization signal, horizontal synchronization signal, data enable signal, clock signal or the like) is not inputted.

However, when an arbitrary one of the first to third driving chips 310A to 310C first detects the non-signal state that the LVDS is not inputted to the control unit, all the driving chips 310*a* to 310C are simultaneously operated in a fail safe mode, and thus a side effect due to the difference in frequency does not occur. This will be described in detail with reference to FIG. 4.

FIG. 4 is a detailed block diagram illustrating an implementation example of the first to third driving chips 310A to 310C illustrated in FIG. 3. As shown in this figure, the first driving chip 310A includes an oscillator 311A, a non-signal detector 312A and a transistor M1, and the second driving 310B includes an oscillator 311B, a non-signal detector 312B and transistor M2. The third driving chip 310C includes an oscillator 311C, a non-signal detector 312C and a transistor M3. Here, the first to third driving chips 310A to 310C have the same structure.

In each of the first to third driving chips 310A to 310C, each of the non-signal detectors 312A to 312C checks a non-signal state that the LVDS is not inputted using a clock signal outputted from each of the oscillators 311A to 311C used only therefor, and outputs a detection signal INT_DET corresponding to the non-signal state.

For example, an operation of detecting a non-signal of the first driving chip 310A will be described. The non-signal detector 312A checks the presence of non-signal state that a normal signal LVDS is not inputted using a clock signal outputted from the oscillator 311A. In a case where the non-signal state is not checked, the non-signal detector 312A outputs the detection signal INT_DET as a 'low' signal. Accordingly, the transistor M1 is maintained in an off state. Thus, a non-signal detection pad DET1 is maintained as 'high.'

On the other hand, the non-signal detector 312A checks the presence of non-signal state that the normal signal LVDS is not inputted as described above. In a case where the non-signal state is checked, the non-signal detector 312A outputs the detection signal INT_DET as a 'high' signal. Accordingly, the transistor M1 is turned on. Thus, the voltage of power terminal VCC, supplied to the non-signal detection pad DET through a resistor R1, is muted to a ground terminal through the transistor M1, and therefore, the state of the non-signal detection pad DET1 is changed into a 'low' state.

Like the first driving chip 310A, each of the second and second driving chips 310B and 310C checks the presence of non-signal state. In a case where the non-signal state is checked, the state of a non-signal detection pad DET2 or DET3 is changed into a 'low' state.

However, the frequencies of clock signals respectively outputted from the oscillators 311A to 311C used in the first to third driving chips 310A to 310C are slightly different as described above. Therefore, in a case where the first to third driving chips 310A to 310C are simultaneously in the non-signal state, the difference between times at which the respective driving chips 310A to 310C sense the non-signal state is generated by the difference in frequency between the oscillators 311A to 311C. FIG. 2 is a waveform diagram illustrating its example.

For example, it is assumed that the frequency of the oscillator 311A used in the first driving chip 310A is fastest, the frequency of the oscillator 311B used in the second driving chip 310B is slower than that in the first driving chip 310A and faster than that in the third driving chip 310C, and the frequency of the oscillator 311C used in the third driving chip 310C is slowest. In this case, as illustrated in (a) to (c) of FIG. 2, the first driving chip first 310A detects the non-signal state, the second driving chip 310B then detects the non-signal state, and the third driving chip 310C finally detects the non-signal state.

However, when an arbitrary one of the first to third driving chips 310A to 310C detects the non-signal state as described above, the state of a corresponding non-signal detection pad among the non-signal detection pads DET1 to DET3 is changed into a 'low' state. As illustrated in FIG. 4, the non-signal detection pads DET1 to DET3 are commonly connected through a detection wire, and the commonly connected point is connected to the power terminal VCC through the resistor R1.

Thus, when an arbitrary one of the first to third driving chips 310A to 310C detects the non-signal state, the states of the non-signal detection pads DET1 to DET3 are simultaneously changed into a 'low' state. Accordingly, the first to third driving chips 310A to 310C are simultaneously operated in a fail safe mode at the time when an arbitrary one of the first to third driving chips 310A to 310C detects the non-signal state.

The 'low' level of the non-signal detection pads DET1 to DET3 can be used for the first to third driving chips 310A to 310C to synchronize a horizontal synchronization signal, vertical synchronization signal, data enable signal, or the like.

(d) of FIG. 2 illustrates a time at which the first to third driving chips 310A to 310C are simultaneously in the non-signal state. At this time, the first to third driving chips 310A to 310C are simultaneously operated in the fail safe mode.

As is apparent from the above description, the present invention provides a circuit for controlling a non-signal of a flat panel display device, in which when driving chips are used in which control units are respectively merged in driving devices, all modes of the other driving chips are simultaneously converted into a fail safe mode when an arbitrary driving chip detects a non-signal state, so that is possible to prevent a system from being in an unstable state in the conversion into the fail safe mode.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A circuit for controlling a non-signal of a flat panel display device, the circuit comprising:

a plurality of driving chips each driving chip comprising a timing controller and a source driver, allowing driving chips in the plurality of driving chips to be simultaneously operated in a fail safe mode when a non-signal state is detected in any one of the plurality of driving chips; and a display panel configured to display an image by being driven by a data voltage corresponding to the grayscale value of data putted from the plurality of driving chips, wherein each of the plurality of driving chips comprises:

an oscillator configured to generate a clock signal; and a non-signal detector configured to detect the non-signal state that the normal signal is not inputted using the clock signal outputted from the oscillator and outputs a signal having a logic corresponding to the non-signal state;

wherein a transistor is configured to be turned on by the signal outputted when the non-signal detector detects the non-signal state so as to simultaneously change potentials of the non-signal detection pads of its own driving chip and another driving chip.

2. The circuit of claim 1, wherein each driving chip further comprises a non-signal detection pad in communication with a voltage source, when the non-signal state is detected, the potentials of the non-signal detection pads in each one of the plurality of driving chips are simultaneously changed so that all the driving chips are operated in the fail safe mode.

3. The circuit of claim 1, wherein the non-signal detection pads are commonly connected to each other and to a power terminal of the voltage source.

4. The circuit of claim 1, wherein, in the plurality of driving chips, the driving chip using the oscillator that generates a clock signal having a frequency higher than that outputted from the oscillator of another driving chip first detects the non-signal state.

5. A circuit for controlling a non-signal of a flat panel display device, the circuit comprising first and second driving chips in which each timing controller and each source driver are merged, wherein:

the first driving chip comprises a first oscillator for generating a first clock, a first signal detector for monitoring the presence of inputting of a normal signal using the first clock and enabling a first control signal when the normal signal is not inputted, and a first transistor having one terminal connected to a ground terminal and the other terminal connected to a first detection pad, the first transistor connecting the first detection pad to the ground terminal in response to the first control signal;

the second driving chip comprises a second oscillator for generating a second clock, a second signal detector for monitoring the presence of inputting of the normal signal using the second clock and enabling a second control signal when the normal signal is not inputted, and a second transistor having one terminal connected to the ground terminal and the other terminal connected to a second detection pad, the second transistor connecting the second detection pad to the ground terminal in response to the second control signal; and the first and second detection pads are commonly connected through a detection wire.

* * * * *